(12) United States Patent
Park et al.

(10) Patent No.: US 10,511,839 B2
(45) Date of Patent: Dec. 17, 2019

(54) IMAGE ENCODING/DECODING METHOD AND DEVICE FOR SAME

(71) Applicant: LG Electronics Inc., Seoul (KR)

(72) Inventors: Seungwook Park, Seoul (KR); Hyeongmoon Jang, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/762,323

(22) PCT Filed: Sep. 23, 2016

(86) PCT No.: PCT/KR2016/010622
§ 371 (c)(1),
(2) Date: Mar. 22, 2018

(87) PCT Pub. No.: WO2017/052250
PCT Pub. Date: Mar. 30, 2017

(65) Prior Publication Data
US 2018/0278940 A1     Sep. 27, 2018

Related U.S. Application Data

(60) Provisional application No. 62/222,774, filed on Sep. 23, 2015.

(51) Int. Cl.
*H04N 19/159*    (2014.01)
*H04N 19/176*    (2014.01)
(Continued)

(52) U.S. Cl.
CPC ......... *H04N 19/159* (2014.11); *H04N 19/109* (2014.11); *H04N 19/136* (2014.11);
(Continued)

(58) Field of Classification Search
CPC .... H04N 19/159; H04N 19/59; H04N 19/523; H04N 19/503
See application file for complete search history.

(56) References Cited

U.S. PATENT DOCUMENTS

2014/0328398 A1    11/2014   Chen et al.
2017/0064313 A1*    3/2017   Wu ................... H04N 19/33

FOREIGN PATENT DOCUMENTS

KR    1020130056441    5/2013
KR    1020150048716    5/2013
(Continued)

OTHER PUBLICATIONS

Li et al: "AHG18: Comments on the Implementations of Resolution Adaption on HEVC", JCTVC-G329, Joint Collaborative Team on Video Coding (JCT-VC) of ITU-T SG16 WP3 and ISO/IEC JTC1/SC29/WG11, 7th Meeting: Geneva, CH, dated Nov. 8, 2011, XP030110313.
(Continued)

*Primary Examiner* — Nam D Pham
(74) *Attorney, Agent, or Firm* — Fish & Richardson P.C.

(57) ABSTRACT

The present invention provides an image encoding/decoding method and a device for same. In particular, the image decoding method may comprise the steps of: determining if the properties of a current picture and a reference picture differ; converting the reference picture to have the same properties as the current picture when the properties of the current picture and reference picture differ; and performing inter-prediction on the current picture by predetermined block unit by means of the converted reference picture.

10 Claims, 20 Drawing Sheets

(51) Int. Cl.

| | |
|---|---|
| *H04N 19/172* | (2014.01) |
| *H04N 19/109* | (2014.01) |
| *H04N 19/136* | (2014.01) |
| *H04N 19/44* | (2014.01) |
| *H04N 19/52* | (2014.01) |
| *H04N 19/503* | (2014.01) |
| *H04N 19/523* | (2014.01) |
| *H04N 19/59* | (2014.01) |
| *H04N 19/46* | (2014.01) |

(52) U.S. Cl.
CPC ......... *H04N 19/172* (2014.11); *H04N 19/176* (2014.11); *H04N 19/44* (2014.11); *H04N 19/503* (2014.11); *H04N 19/52* (2014.11); *H04N 19/523* (2014.11); *H04N 19/59* (2014.11); *H04N 19/46* (2014.11)

(56) References Cited

FOREIGN PATENT DOCUMENTS

| KR | 1020140102639 | 8/2014 |
| KR | 1020150027639 | 8/2014 |
| KR | 1020150055005 | 3/2015 |
| WO | WO2016108188 | 7/2016 |

OTHER PUBLICATIONS

Jens-Uwe Garbas et al: "Inter-Layer Prediction for Backwards Compatible High Dynamic Range Video Coding with SVC", 2012 Picture Coding Symposium, May 7-9, 2012, pp. 285-288, XP055035500.

Extended European Search Report in European Application No. 16848975.5, dated Mar. 14, 2019, 10 pages.

* cited by examiner

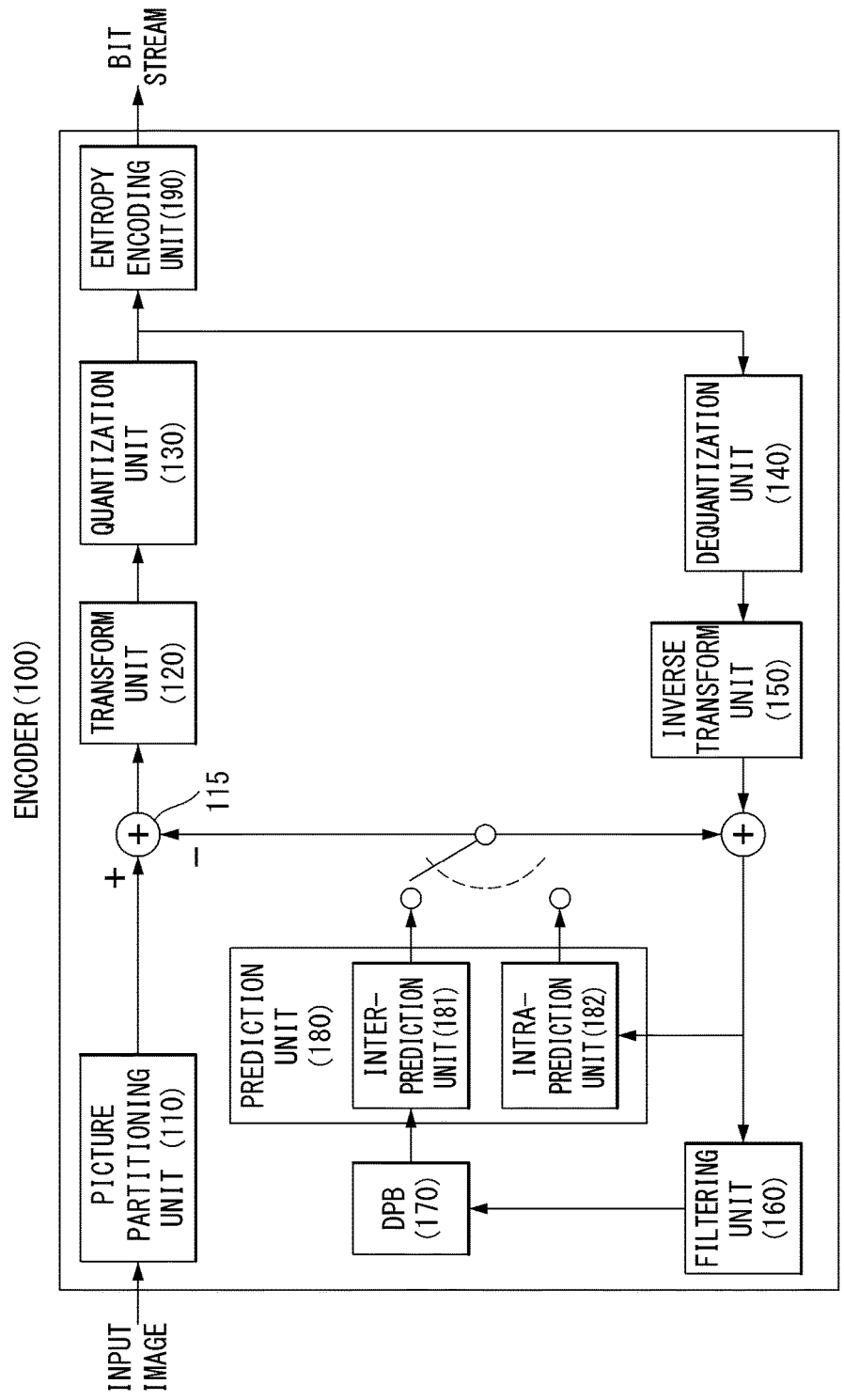

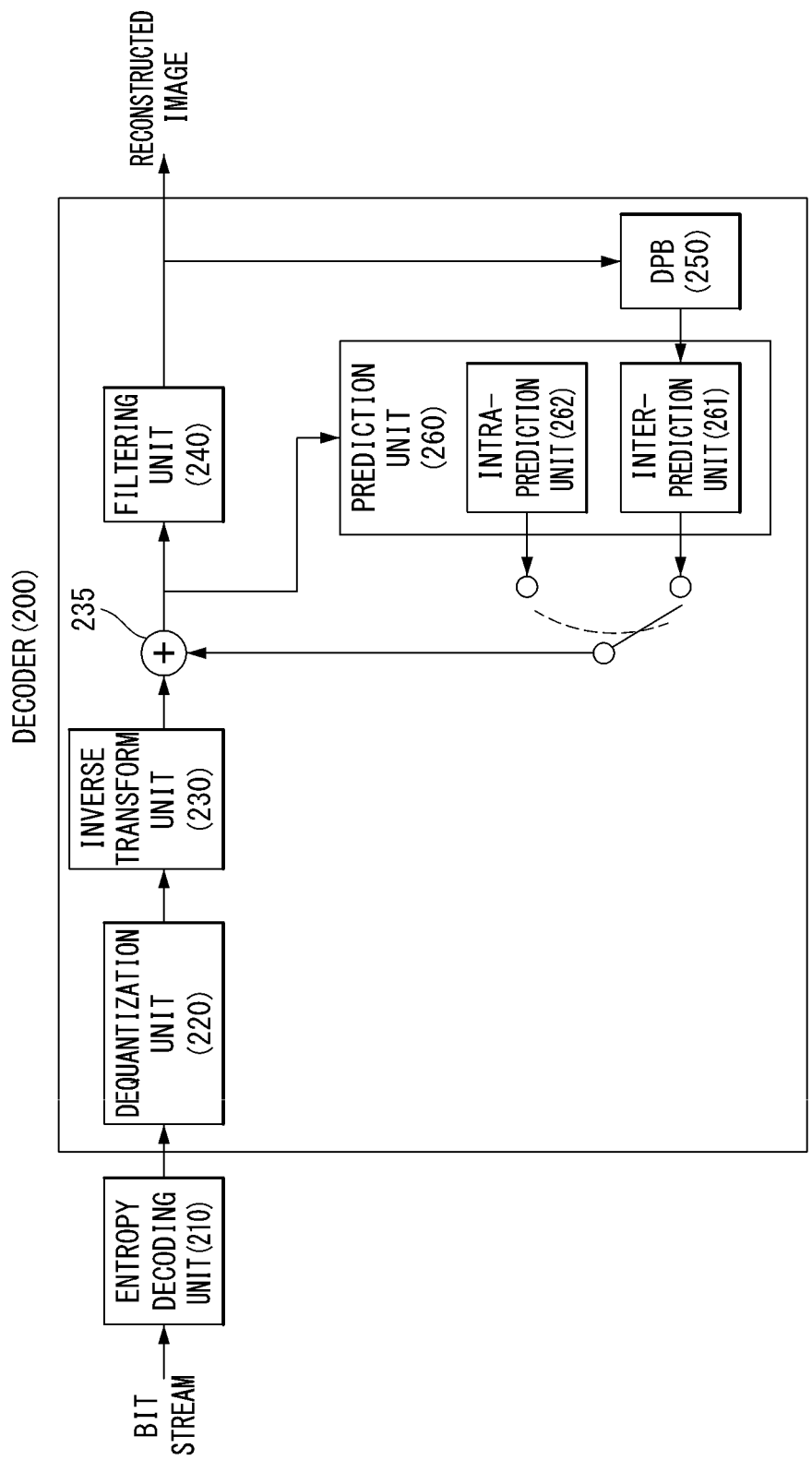

[Fig. 3]
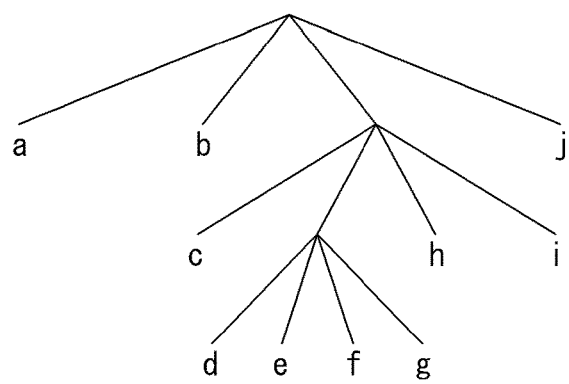
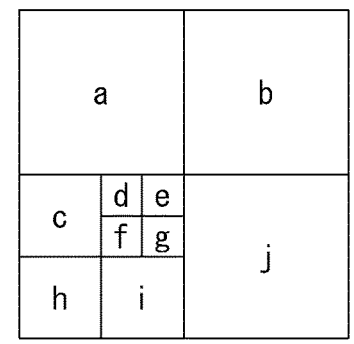
(A)　　　　　　　　(B)

[Fig. 4]
Intra:
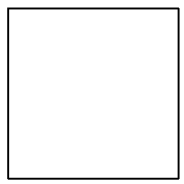
2Nx2N
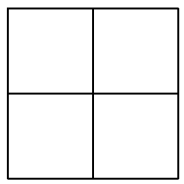
NxN
Inter:
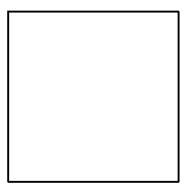
2Nx2N
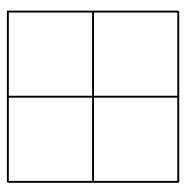
NxN
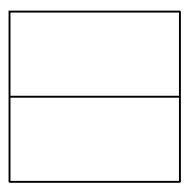
2NxN
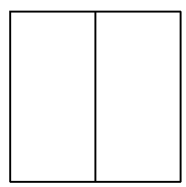
Nx2N
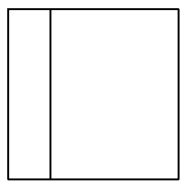
nLx2N
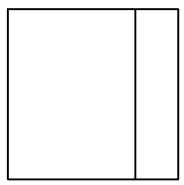
nRx2N
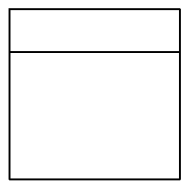
2NxnU
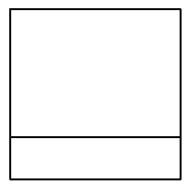
2NxnD

[Fig. 5]
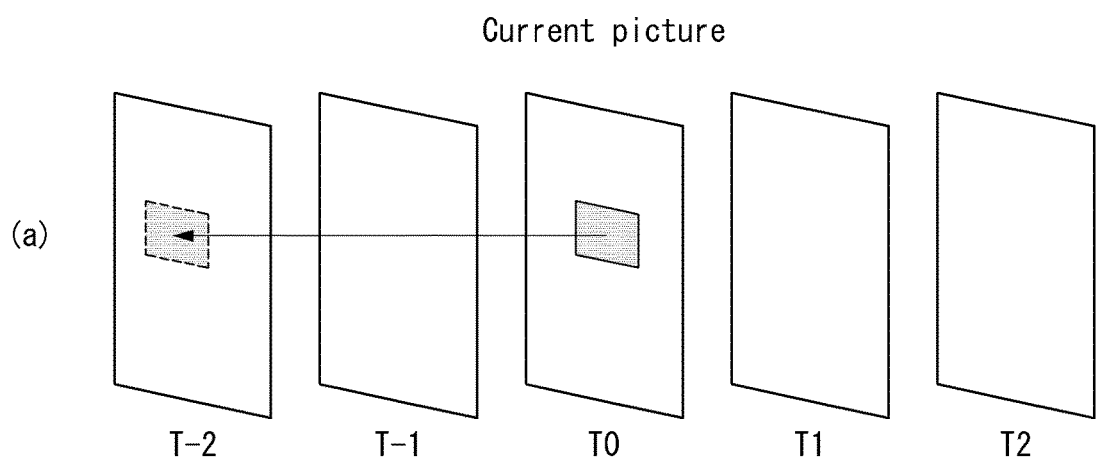
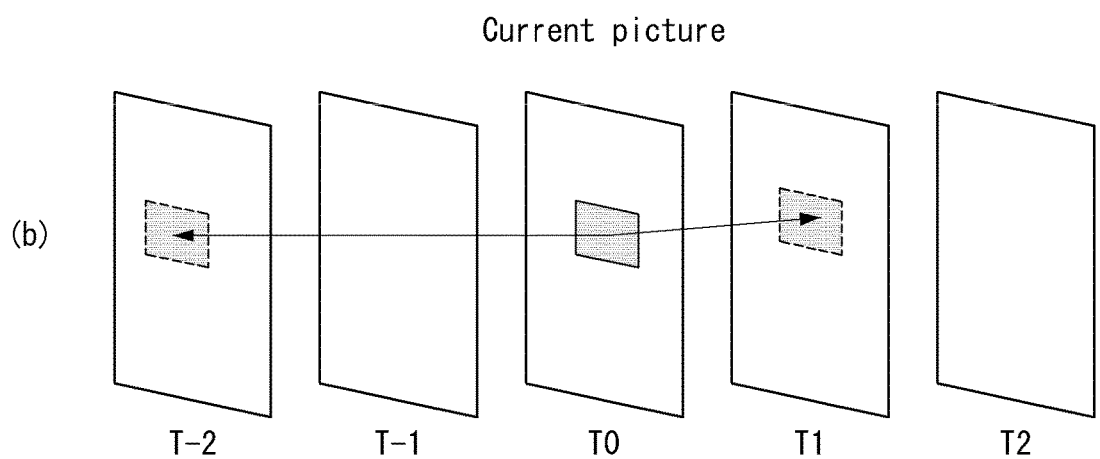

[Fig. 6]

| A<br>-1,-1 | | | | A<br>0,-1 | a<br>0,-1 | b<br>0,-1 | c<br>0,-1 | A<br>1,-1 | | | | A<br>2,-1 |
|---|---|---|---|---|---|---|---|---|---|---|---|---|
| | | | | | | | | | | | | |
| | | | | | | | | | | | | |
| | | | | | | | | | | | | |
| A<br>-1,0 | | | | A<br>0,0 | a<br>0,0 | b<br>0,0 | c<br>0,0 | A<br>1,0 | | | | A<br>2,0 |
| d<br>-1,0 | | | | d<br>0,0 | e<br>0,0 | f<br>0,0 | g<br>0,0 | d<br>1,0 | | | | d<br>2,0 |
| h<br>-1,0 | | | | h<br>0,0 | i<br>0,0 | j<br>0,0 | k<br>0,0 | h<br>1,0 | | | | h<br>2,0 |
| n<br>-1,0 | | | | n<br>0,0 | p<br>0,0 | q<br>0,0 | r<br>0,0 | n<br>1,0 | | | | n<br>2,0 |
| A<br>-1,1 | | | | A<br>0,1 | a<br>0,1 | b<br>0,1 | c<br>0,1 | A<br>1,1 | | | | A<br>2,1 |
| | | | | | | | | | | | | |
| | | | | | | | | | | | | |
| | | | | | | | | | | | | |
| A<br>-1,2 | | | | A<br>0,2 | a<br>0,2 | b<br>0,2 | c<br>0,2 | A<br>1,2 | | | | A<br>2,2 |

[Fig. 7]
(a)
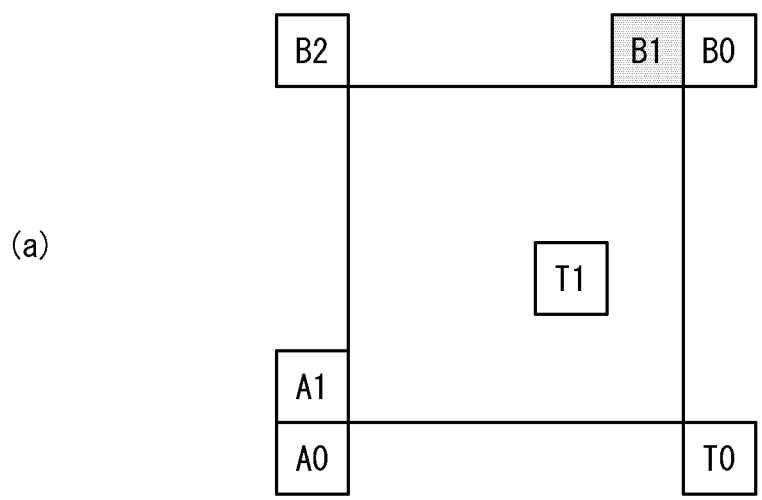
(b)
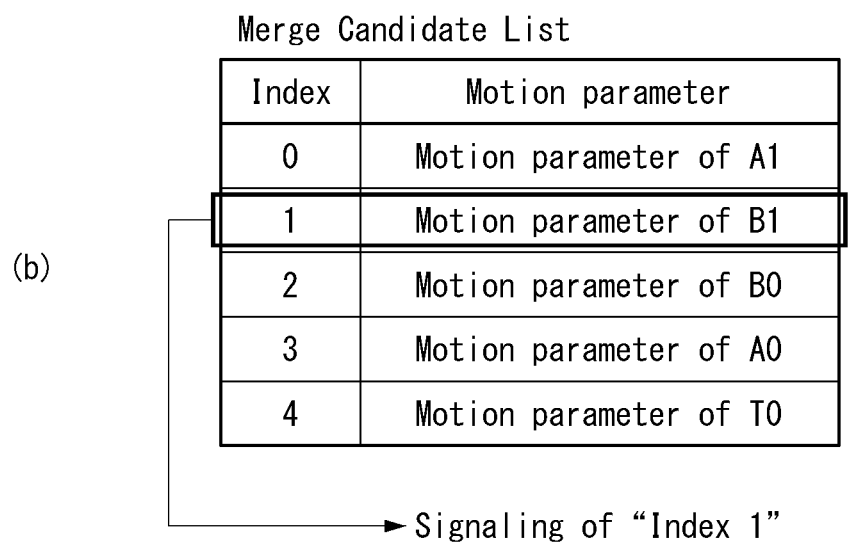

[Fig. 8]
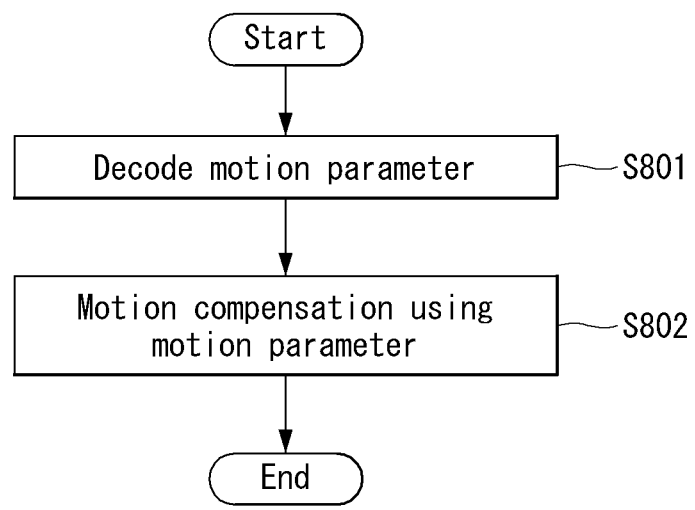

[Fig. 9]
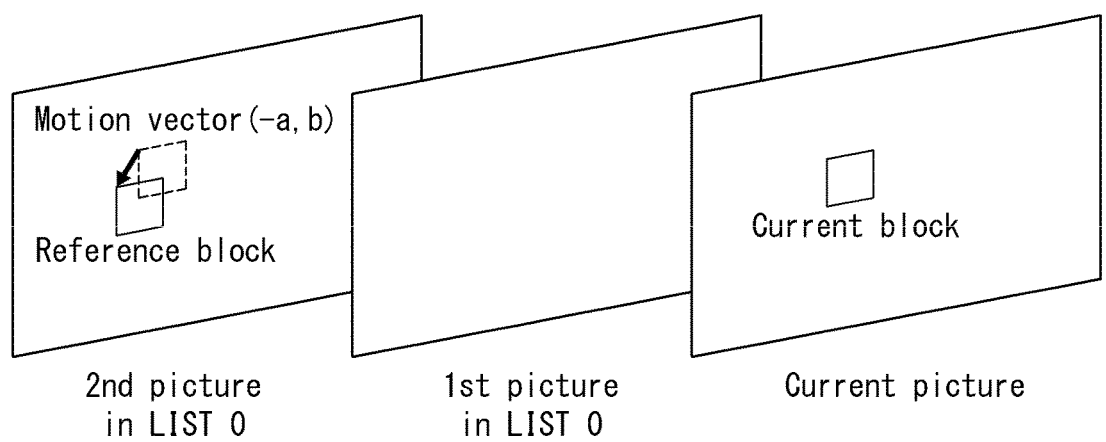

[Fig. 10]
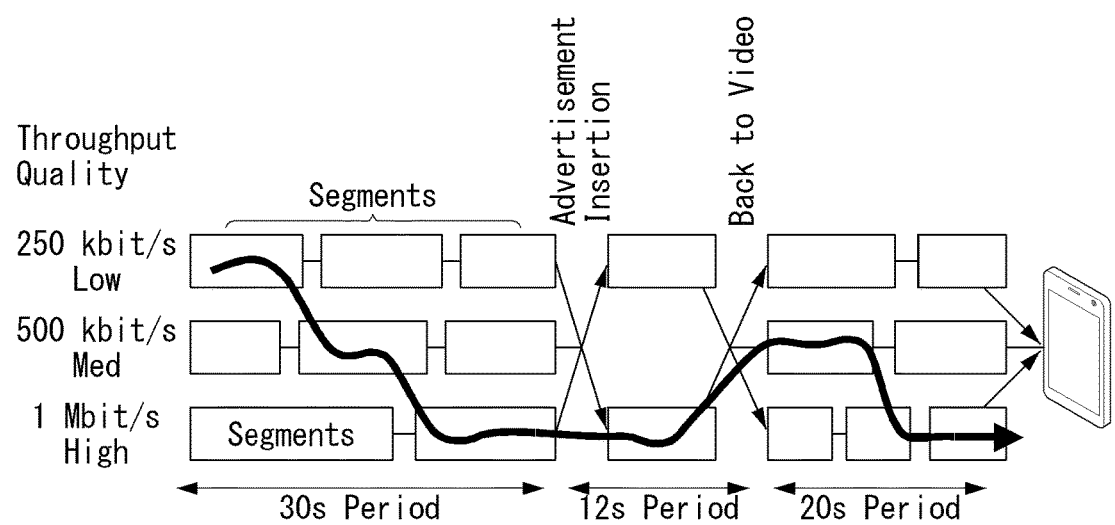

[Fig. 11]
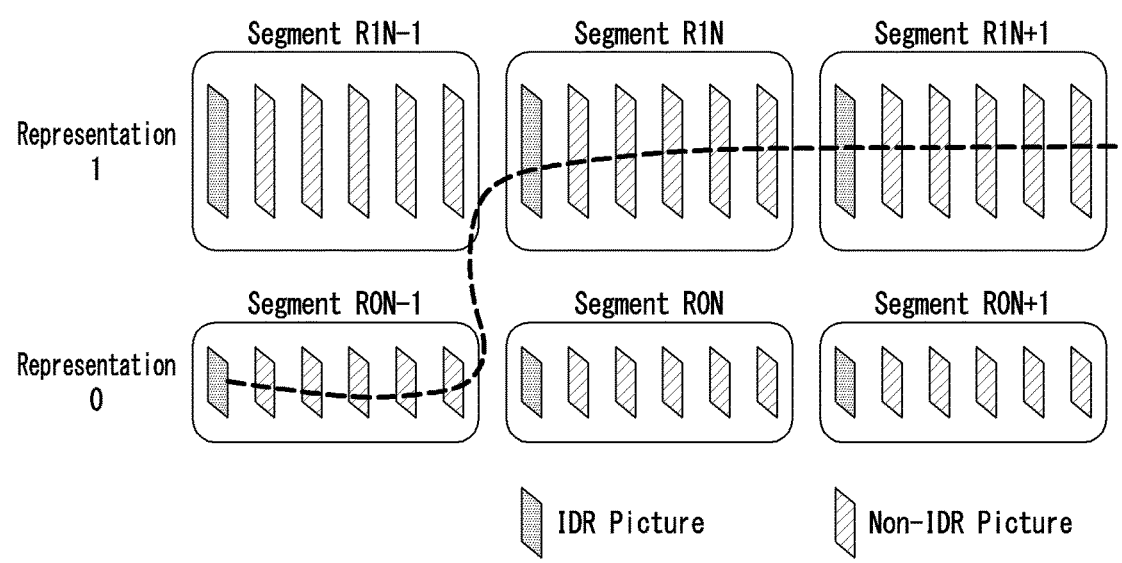

[Fig. 12]
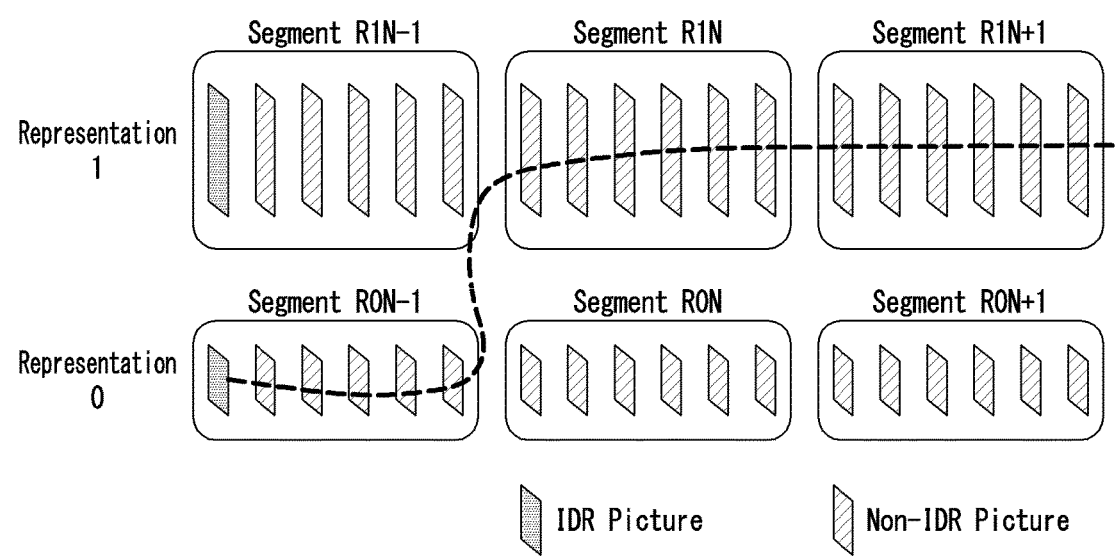

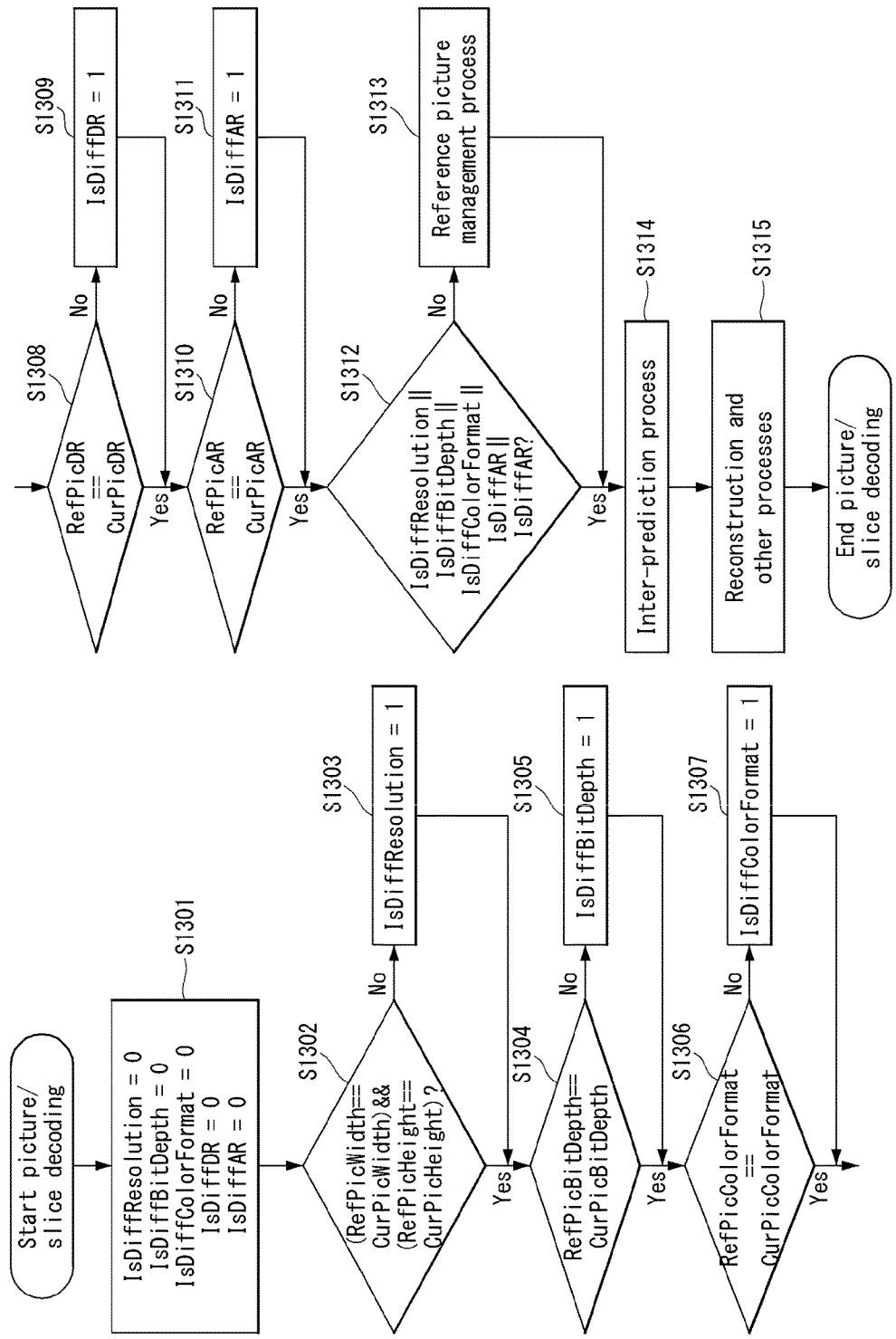
[Fig. 13]

[Fig. 14]
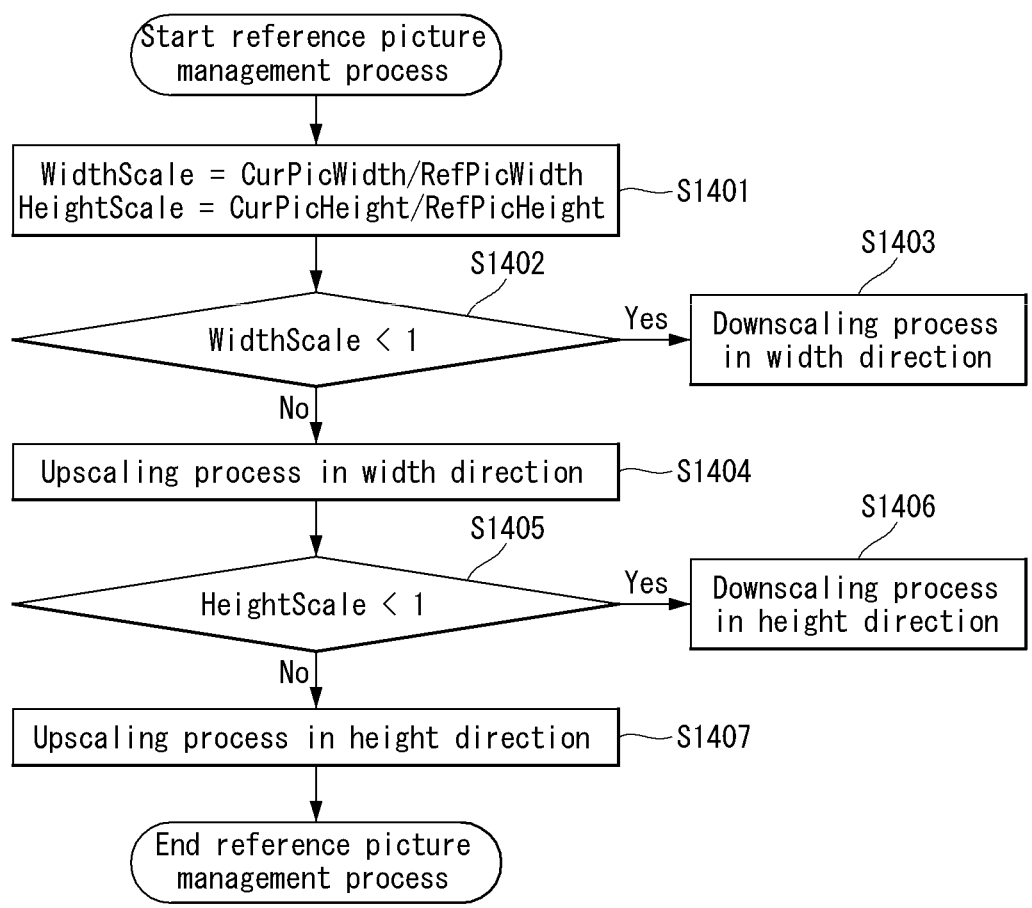

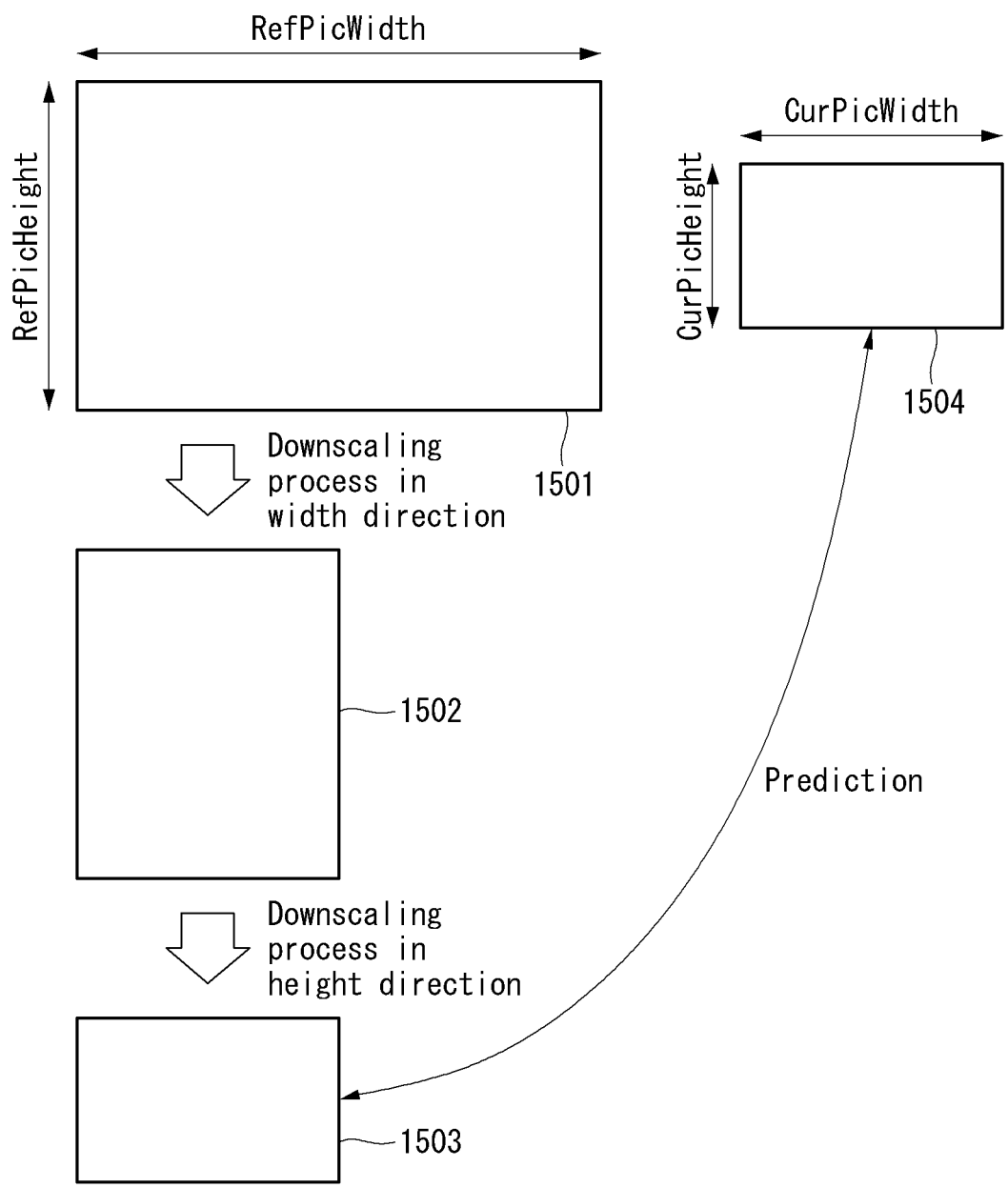
[Fig. 15]

[Fig. 16]
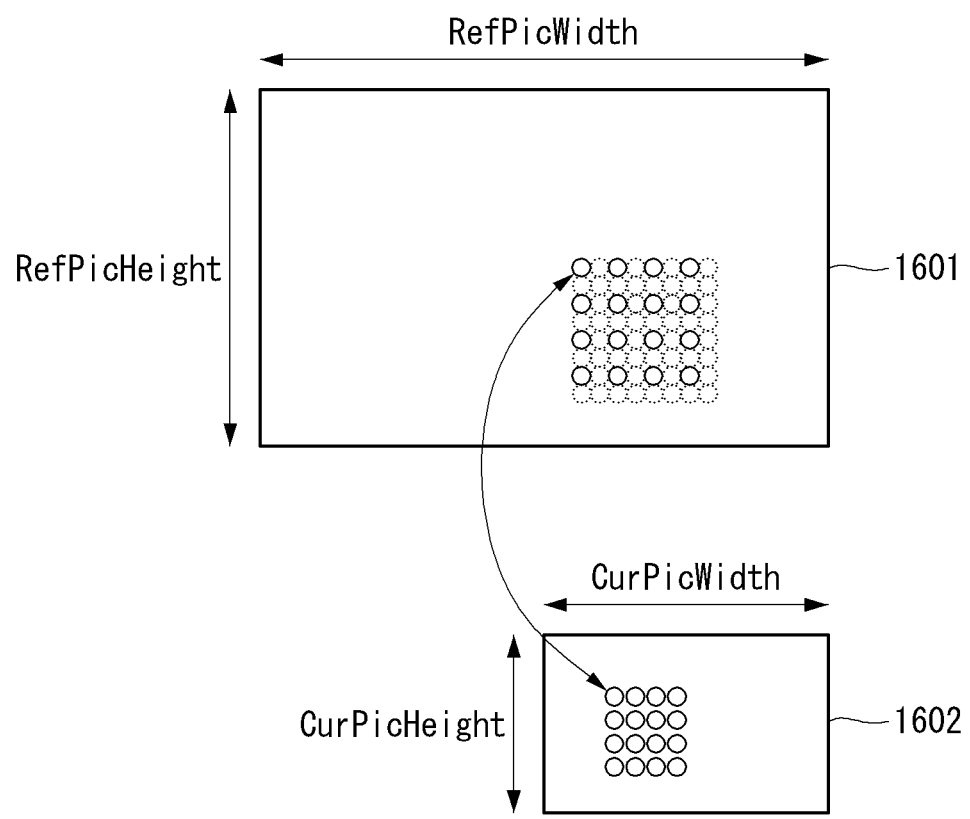

[Fig. 17]
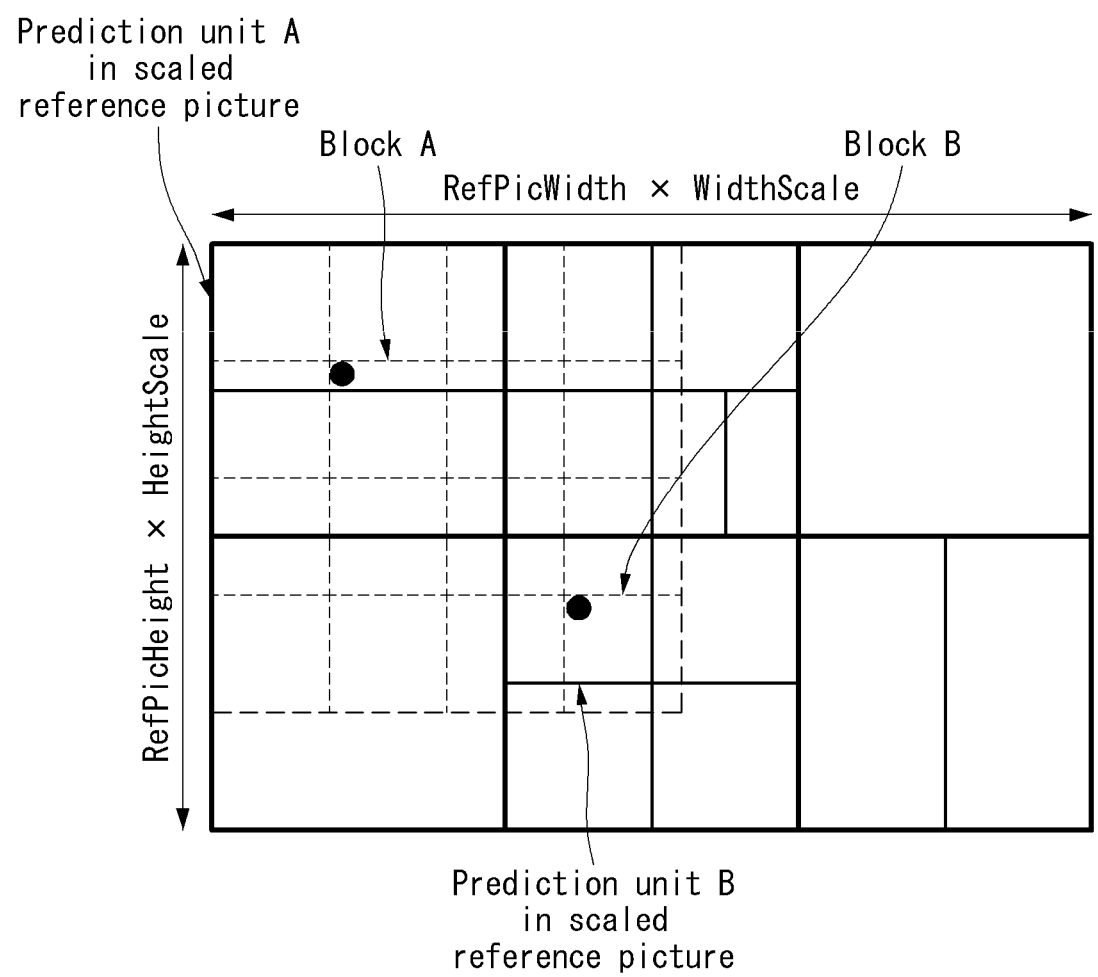

[Fig. 18]
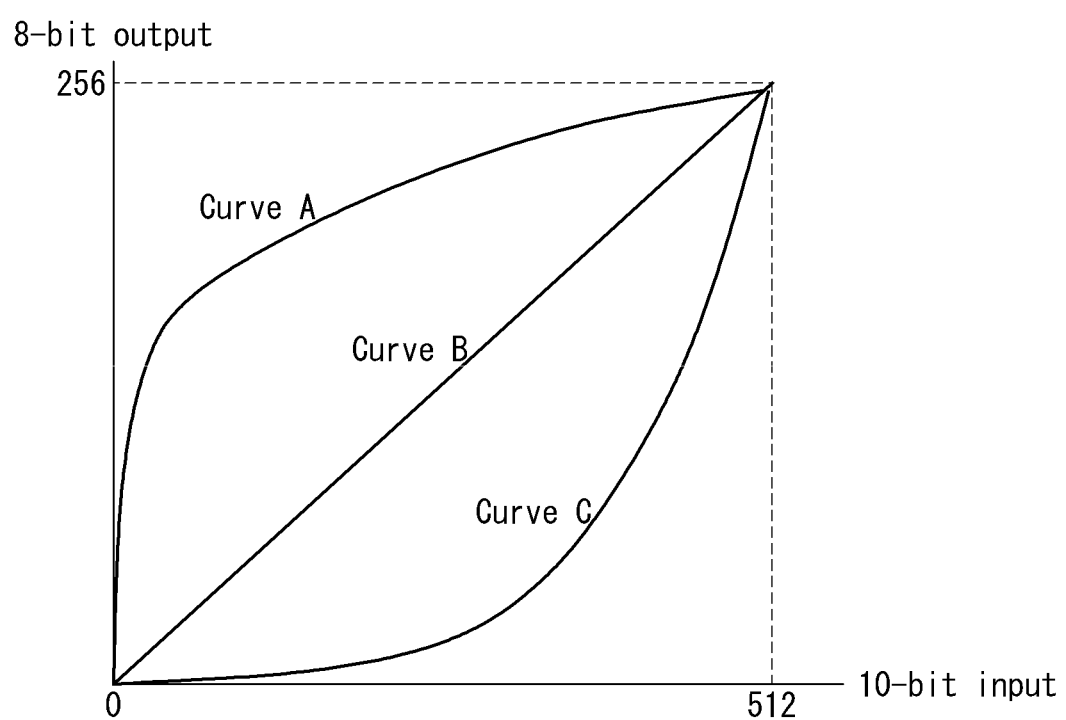

[Fig. 19]
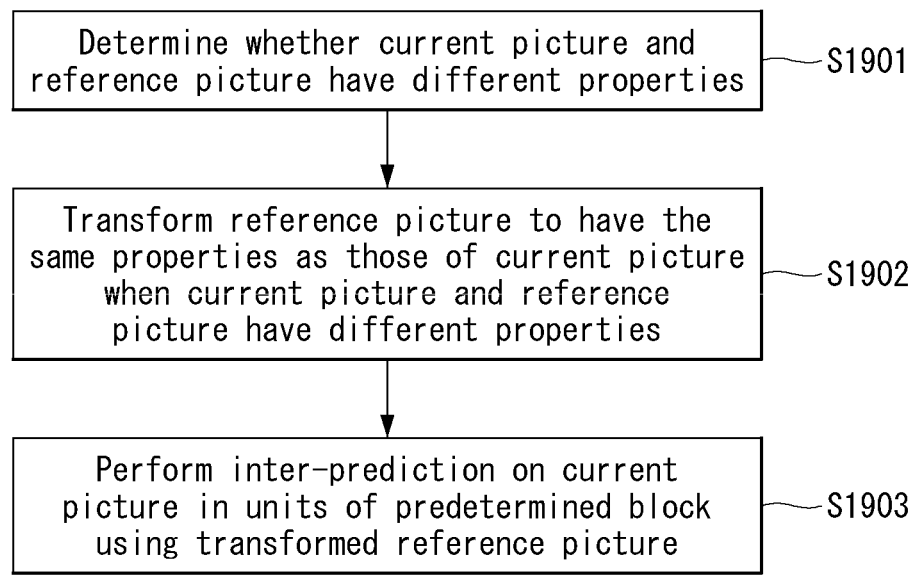

[Fig. 20]
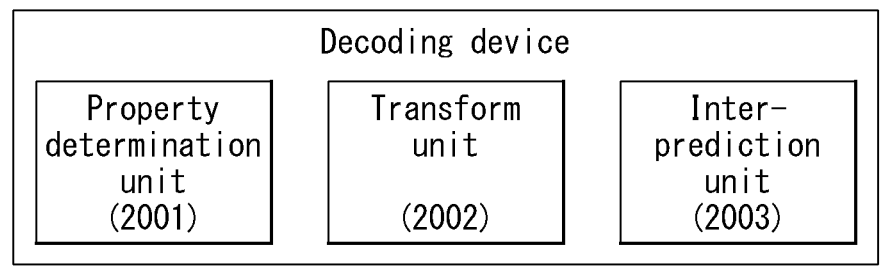

IMAGE ENCODING/DECODING METHOD AND DEVICE FOR SAME

CROSS-REFERENCE TO RELATED APPLICATIONS

This application is a National Stage application under 35 U.S.C. § 371 of International Application No. PCT/KR2016/010622, filed Sep. 23, 2016, which claims the benefit of U.S. Application No. 62/222,774, filed on Sep. 23, 2015. The disclosures of the prior applications are incorporated by reference in their entirety.

TECHNICAL FIELD

The present invention relates to a video processing method, and more specifically, to a video encoding/decoding method using inter-prediction and a device supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An object of the present invention is to propose a method for encoding/decoding an image composed of multiple representations.

In addition, an object of the present invention is to propose a method for encoding/decoding pictures having different properties.

Technical objects to be achieved by the present invention are not limited to the aforementioned technical objects, and other technical objects not described above may be evidently understood by a person having ordinary skill in the art to which the present invention pertains from the following description.

Technical Solution

In one aspect of the present invention, a video decoding method may include: determining whether a current picture and a reference picture have different properties; transforming the reference picture to have the same properties as those of the current picture when the current picture and the reference picture have different properties; and performing inter-prediction on the current picture in units of a predetermined block using the transformed reference picture.

In one aspect of the present invention, a video decoding device may include: a property determination unit for determining whether a current picture and a reference picture have different property; a transform unit for transforming the reference picture to have the same property as those of the current picture when the current picture and the reference picture have different property; and an inter-prediction unit for performing inter-prediction on the current picture in units of a predetermined block using the transformed reference picture.

Preferably, the property may include at least one of a resolution, a bit-depth, a color format, a dynamic range and an aspect ratio.

Preferably, when the ratio of the width and/or height of the current picture to the width and/or height of the reference picture is less than 1, the reference picture may be downscaled by the ratio in the width and/or height directions.

Preferably, when the ratio of the width and/or height of the current picture to the width and/or height of the reference picture is greater than 1, the reference picture may be upscaled by the ratio in the width and/or height directions.

Preferably, a prediction sample of the block may be derived from the reference picture through n:1 subsampling without downscaling the reference picture when motion information in units of 1/n fractional-pel is used.

Preferably, a motion vector of the reference picture may be scaled by a scaling factor of down/upscaling of the reference picture and a motion vector of a prediction block including a left-top sample of the block and included in the reference picture may be allocated in units of a block having a minimum size that can have a motion vector.

Preferably, a dynamic range and/or a bit-depth of the reference picture may be transformed using a predetermined linear or nonlinear function when the dynamic range and/or the bit-depth of the reference picture differ from those of the current picture.

Preferably, a chrominance component of the reference picture may be up/downscaled in the horizontal and vertical directions when the reference picture and the current picture have different color formats.

Advantageous Effects

According to embodiments of the present invention, it is possible to smoothly decode an image composed of multiple representations.

In addition, according to embodiments of the present invention, it is possible to smoothly decode pictures having different properties.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram illustrating the direction of inter-prediction.

FIG. 6 is an embodiment to which the present invention may be applied and illustrates integers for ¼ sample interpolation and a fraction sample locations.

FIG. 7 is an embodiment to which the present invention may be applied and illustrates the location of a spatial candidate.

FIG. 8 is an embodiment to which the present invention is applied and is a diagram illustrating an inter-prediction method.

FIG. 9 is an embodiment to which the present invention may be applied and is a diagram illustrating a motion compensation process.

FIG. 10 is a diagram illustrating an adaptive streaming method to which the present invention is applicable.

FIGS. 11 and 12 are diagrams illustrating adaptive streaming methods using multiple representations to which the present invention is applicable.

FIG. 13 illustrates a method of detecting whether a current picture and a reference picture have different properties/characteristics according to an embodiment of the present invention.

FIG. 14 illustrates a reference picture management process when a current picture and a reference picture have different resolutions according to an embodiment of the present invention.

FIG. 15 is a schematic diagram of the reference picture management process of FIG. 14.

FIG. 16 is a diagram illustrating a method of performing downsampling prediction according to an embodiment of the present invention.

FIG. 17 illustrates a method of scaling motion information when a current picture and a reference picture have different resolutions according to an embodiment of the present invention.

FIG. 18 illustrates a homography matrix for correcting a difference between bit-depths or dynamic ranges of a current picture and a reference picture according to an embodiment of the present invention.

FIG. 19 is a diagram illustrating a video decoding method according to an embodiment of the present invention.

FIG. 20 is a diagram illustrating a decoding device according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc. may be properly replaced and interpreted in each coding process.

In the present description, "block" or "unit" refers to a unit of performing an encoding/decoding process such as prediction, transformation and/or quantization and may be composed of multi-dimension arrangement of samples (or pixels).

"Block" or "unit" may refer to multi-dimension arrangement of samples with respect to a luma component or multi-dimension arrangement of samples with respect to a chroma component. In addition, "block" or "unit" may commonly refer to multi-dimension arrangement of samples with respect to a luma component and multi-dimension arrangement of samples with respect to a chroma component.

For example, "block" or "unit" can be interpreted as the meaning including a coding block (CB) which refers to arrangement of samples to be encoded/decoded, a coding tree block (CTB) composed of a plurality of coding blocks, a prediction block (PB) (or prediction unit (PU)) which refers to arrangement of samples to which the same prediction is applied, and a transform block (TB) (or transform unit (TU)) which refers to arrangement of samples to which the same transformation is applied.

Furthermore, "block" or "unit" may be interpreted as the meaning including a syntax structure used in a process of encoding/decoding arrangement of samples with respect to a luma component and/or a chroma component unless otherwise mentioned. Here, the syntax structure refers to 0 or more syntax elements present in a bitstream in a specific order, and a syntax element refers to a data element represented in a bitstream.

For example, "block" or "unit" can be interpreted as the meaning including a coding unit (CU) including a coding block and a syntax structure used for encoding of the coding block, a coding tree unit composed of a plurality of coding units, a prediction unit (PU) including a prediction block and a syntax structure used for prediction of the prediction block, and a transform unit (TU) including a transform block and a syntax structure used for transformation of the transform block.

In addition, in the present description, "block" or "unit" is not limited to arrangement of samples (or pixels) in a square or rectangular form and may refer to arrangement of samples (or pixels) in a polygonal form having three or more vertexes. In this case, it may be referred to as a polygon block or a polygon unit.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more blocks.

The subtractor 115 generates a residual signal (or residual block) by subtracting a predicted signal (or predicted block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal (or reconstructed block) may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a predicted signal (or predicted block). Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The predicted signal (or predicted block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the predicted signal (or predicted block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Block Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD).

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current block on which decoding is performed, the decoded part of a current picture or other pictures including the current block may be used.

A picture (slice) using only a current picture for reconstruction, that is, on which only intra-prediction is performed, may be called an intra-picture or I picture (slice), a picture (slice) using a maximum of one motion vector and reference index in order to predict each block may be called a predictive picture or P picture (slice), and a picture (slice) using a maximum of two motion vector and reference indices may be called a bi-predictive picture or B a picture (slice).

Intra-prediction means a prediction method of deriving a current block from the data element (e.g., a sample value) of the same decoded picture (or slice).

That is, intra-prediction means a method of predicting the pixel value of a current block with reference to reconstructed regions within a current picture.

Hereinafter, inter-prediction is described in more detail.

Inter-Prediction (or Inter-Frame Prediction)

Inter-prediction means a prediction method of deriving a current block based on the data element (e.g., sample value or motion vector) of a picture other than a current picture. That is, inter-prediction means a method of predicting the pixel value of a current block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present invention may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0 , L1 or bidirectional)), a reference index (or reference picture index or reference list index), and motion vector information. The motion vector information may include a motion vector, motion vector predictor (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current block is searched for in reference pictures in an inter-prediction process. Furthermore, the encoder may provide the decoder with a motion parameter for a reference region.

The encoder/decoder may obtain the reference region of a current block using a motion parameter. The reference region is present in a reference picture having a reference index. Furthermore, the pixel value or interpolated value of a reference region specified by a motion vector may be used as the predictor of a current block. That is, motion compensation in which an image of a current block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current block using motion information of other decoded blocks and obtains a motion vector value for the current block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction.

Furthermore, the fractional sample interpolation of a chroma component applies a 4 tab filter in the traverse direction and the longitudinal direction.

FIG. 6 is an embodiment to which the present invention may be applied and illustrates integers for ¼ sample interpolation and a fraction sample locations.

Referring to FIG. 6, a shadow block in which an uppercase letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

FIG. 7 is an embodiment to which the present invention may be applied and illustrates the location of a spatial candidate.

Referring to FIG. 7(*a*), whether each spatial candidate block is available depending on the sequence of {A1, B1, B0, A0, B2 } is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx [x0][y0]'). FIG. 7(*b*) illustrates a case where a B1 block has been selected from the merge candidate list. In this case, an "index 1 (Index 1)" may be signaled to the decoder as a merge index.

The decoder configures a merge candidate list like the encoder, and derives motion information about a current block from motion information of a candidate block corresponding to a merge index from the encoder in the merge candidate list. Furthermore, the decoder generates a prediction block for a current block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion vector predictor flag (i.e., candidate block information) (e.g., mvp_IX_flag[x0] [y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion vector predictor flag received from the encoder in the motion vector predictor candidate list. Furthermore, the decoder obtains a motion vector value for the current block using the derived motion vector predictor and a motion vector difference transmitted by the encoder. Furthermore, the decoder generates a prediction block (i.e., an array of predicted samples) for the current block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a current block (e.g., a prediction block) (S801).

For example, if the merge mode has been applied to the current block, the decoder may decode a merge index signaled by the encoder. Furthermore, the motion parameter of the current block may be derived from the motion parameter of a candidate block indicated by the merge index.

Furthermore, if the AMVP mode has been applied to the current block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion vector predictor flag, and may derive the motion vector predictor of a current block using the motion vector predictor and the received motion vector difference.

The decoder performs motion compensation on a current block unit using the decoded motion parameter (or information) (S802).

That is, the encoder/decoder perform motion compensation in which an image of a current block is predicted (i.e., a prediction block of the current block is generated) from a previously decoded picture using the decoded motion parameter. In other words, the encoder/decoder can derive a predicted block (i.e., arrangement of predicted samples) of the current block from samples of an area corresponding to the current block in a previously decoded reference picture.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST 0, LIST 0, and a motion vector (−a, b).

In this case, as in FIG. 9, the current block is predicted using the values (i.e., the sample values of a reference block) of a location (−a, b) spaced apart from the current block in the second picture of LIST 0.

In the case of bi-directional prediction, another reference list (e.g., LIST 1), a reference index and a motion vector difference are transmitted. The decoder derives two reference blocks and predicts a current block based on the two reference blocks (i.e., generates predicted sample of the current block).

Efficient Prediction for Multiple Representation Application

The present invention proposes encoding/decoding methods when content composed of multiple representations is streamed.

FIG. 10 is a diagram illustrating an adaptive streaming method to which the present invention is applicable.

Multiple representations refer to production of a single piece of content as images of various versions from a low bitrate to a high bitrate such as various resolutions and various qualities. This is a content production method for adaptive streaming used for a user who uses a streaming service to use the service seamlessly even when a network state changes, as shown in FIG. 10.

Such multiple representations produced for adaptive streaming can be split into segments for switching between representations.

Here, pictures in a single segment can be generally encoded in the form of a closed group of pictures (GOP) such that they cannot refer to pictures of other segments in order to prevent generation of a decoding problem during switching. However, a closed GPO is not mandatory and thus the pictures may be encoded in the form of an open GOP.

If only qualities of different segments differ, picture quality may be slightly deteriorated but a decoder can perform a normal decoding process. On the other hand, when pictures of different segments have different resolutions, the decoder may not decode the pictures or considerable picture quality deterioration may occur.

Accordingly, the present invention proposes a method for performing decoding normally (or without considerable picture quality deterioration) even when pictures having different properties/characteristics (e.g., picture resolutions, bit-depths, color formats, dynamic ranges, aspect ratios, etc.) refer to each other.

Issues generated in the aforementioned adaptive streaming service will be described in more detail below.

FIGS. 11 and 12 illustrate adaptive streaming methods using multiple representations to which the present invention is applicable.

FIG. 11 illustrates a closed GOP case and FIG. 12 illustrates an open GOP case.

MPEG (Moving Picture Experts Group) DASH (Dynamic Adaptive Streaming over HTTP) which is a typical adaptive streaming technique is described as an example. Since all segments are encoded such that decoding is started from an IDR (Instantaneous Decoding Refresh) picture (i.e., closed GOP structure) in general, as described above, a decoder can perform decoding without a problem even if switching from segment R0N-1 to segment R1N occurs.

Such segments can have a length varied according to how quickly the segments are adapted to change in a network. For example, when the segment length is 10 seconds, representation can be changed at an interval of 10 seconds even if network change occurs every second.

If the segment length is 5 seconds, representation can be changed at an interval of 5 seconds and thus it is possible to cope with change in the network more precisely.

However, capacity of each representation may rapidly increase as the segment length decreases. This is caused by an increase in the number of IDR pictures. In general, the size of an IDR picture is twice to ten times the size of a non-IDR picture. Furthermore, when the segment length decreases, GOP size is reduced and inter-picture coding efficiency is also decreased, increasing representation capacity.

To solve such problems (i.e., coding efficiency problem and the like), it is desirable to permit prediction between different segments, as shown in FIG. 12. However, although problems are not generated when prediction is permitted in the same representation, decoding problems (e.g., decoder crash, considerable picture quality deterioration, etc.) may be generated when switching occurs and thus prediction is performed between segments of different representations.

For example, it is assumed that the picture size of representation 0 is 1280×720 and the picture size of representation 1 is 1920×1080. If switching of segment R0N-1 →segment R1N occurs, a current picture of 1920×1080 performs prediction from a reference picture of 1280×720 stored in a DPB. Here, images are remarkably distorted because prediction is performed using the reference picture having a size completely different from the size during encoding. In addition, the decoder stops or malfunctions when the position of the current block deviates from the position of x=1280 and y=720 because there is no image corresponding to the reference picture.

Such problems can be generated in various cases such as a case in which representations have different bit-depths, a case in which representations have different dynamic ranges, a case in which representations have different color formats, a case in which representations have different aspect ratios as well as a case in which representations have different resolutions.

Accordingly, the present invention proposes a method of detecting a property/characteristic difference when prediction is performed between two pictures having different properties/characteristics as described above, and various prediction methods for efficiently predicting pictures without decoder malfunction or considerable picture quality deterioration when the pictures have different properties/characteristics.

Hereinafter, a method of detecting whether a current picture (or slice) and a reference picture have different properties/characteristics is proposed as an embodiment of the present invention.

FIG. 13 illustrates a method of detecting whether a current picture and a reference picture have different properties/characteristics according to an embodiment of the present invention.

Referring to FIG. 13, when decoding of the current picture (or slice) is started, a decoder sets the value of a parameter indicating whether the current picture and the reference picture have different properties/characteristics to 0 for each property/characteristic (S1301).

In FIG. 13, a parameter indicating whether resolutions differ is represented by 'IsDiffResolution', a parameter indicating whether bit-depths differ is represented by 'IsDiffBitDepth', a parameter indicating whether color formats differ is represented by 'IsDiffColorFormat', a parameter indicating whether dynamic ranges differ is represented by 'IsDiffDR', and a parameter indicating whether aspect ratios differ is represented by 'IsDiffAR'. That is, the decoder sets the values of the aforementioned parameters to 0.

The decoder determines whether the width RefPicWidth of the reference picture equals the width CurPicWidth of the current picture and the height RefPicHeight of the reference picture equals to the height CurPicHeight of the current picture (S1302).

That is, the decoder determines whether the current picture and the reference picture have the same resolution.

When the current picture and the reference picture do not have the same resolution as a determination result in step S1302, the decoder sets IsDiffResolution to 1 (S1303).

When the current picture and the reference picture have the same resolution as a determination result in step S1302, the decoder determines whether the bit-depth RefPicBitDepth of the reference picture is identical to the bit-depth CurPicBitDepth of the current picture (S1304).

When the current picture and the reference picture do not have the same bit-depth as a determination result in step S1304, the decoder sets IsDiffBitDepth to 1 (S1305).

When the current picture and the reference picture have the same bit-depth as a determination result in step S1304, the decoder determines whether the color format RefPicColorFormat of the reference picture is identical to the color format CurPicColorFormat of the current picture (S1306).

When the current picture and the reference picture do not have the same color format as a determination result in step S1306, the decoder sets IsDiffColorFormat to 1 (S1307).

When the current picture and the reference picture have the same color format as a determination result in step S1306, the decoder determines whether the dynamic range RefPicDR of the reference picture is identical to the dynamic range CurPicDR of the current picture (S1308).

When the current picture and the reference picture do not have the same dynamic range as a determination result in step S1308, the decoder sets IsDiffDR to 1 (S1309).

When the current picture and the reference picture have the same dynamic range as a determination result in step S1308, the decoder determines whether the aspect ratio of the reference picture is identical to the reference ratio of the current picture (S1310).

When the current picture and the reference picture do not have the same aspect ratio as a determination result in step S1310, the decoder sets IsDiffAR to 1 (S1311).

When the current picture and the reference picture have the same aspect ratio as a determination result in step S1310, the decoder determines whether the current picture and the reference picture have the same resolution, bit-depth, color format, dynamic range and aspect ratio (i.e., all of IsDiffResolution, IsDiffBitDepth, IsDiffColorFormat, IsDiffDR and IsDiffAR are 0) or not (any one is 1) (S1312).

When any one property/characteristic of the current picture differs from that of the reference picture as a determination result in step S1312, the decoder performs a reference picture management process (RPMP) (S1313).

The reference picture management process refers to an operation of modifying a reference picture such that the reference picture has the same properties as those of a current picture, which will be described in more detail later.

The decoder performs an inter-prediction process on the current picture on the basis of the reference picture derived through the reference picture management process (S1314).

When all properties/characteristics of the current picture are identical to those of the reference picture as a determination result in step S1312, the decoder performs an inter-prediction process (S1314). That is, in this case, the decoder performs the inter-prediction process on the current picture on the basis of a reference picture to which the aforementioned reference picture management process is not applied.

Then, the decoder reconstructs the current picture and performs other processes (e.g., filtering, etc.) (S1315).

Although FIG. 13 illustrates resolution, bit-depth, color format, dynamic range and aspect ratio as properties/characteristics of pictures, the present invention is not limited thereto and some of them may be used or properties/ characteristics other than the properties/characteristics illustrated in FIG. 13 may be additionally used.

Furthermore, although FIG. 13 illustrates a process of sequentially comparing resolutions, bit-depths, color formats, dynamic ranges and aspect ratios between the current picture and the reference picture to determine whether the current picture and the reference picture have different properties/characteristics, the present invention is not limited thereto and whether the current picture and the reference picture have different properties/characteristics may be determined in an order different from that illustrated in FIG. 13.

Hereinafter, the reference picture management process will be described in more detail.

As an embodiment of the reference picture management process, a method of efficiently decoding a current picture when the resolution of the current picture differs from the resolution of a reference picture is proposed.

FIG. 14 illustrates a reference picture management process when the current picture and the reference picture have different resolutions according to an embodiment of the present invention.

It is desirable to separately consider widths and heights with respect to a resolution difference between the current picture and the reference picture because picture aspect ratios may differ between representations.

Referring to FIG. 14, a decoder sets a width scaling parameter WidthScale using the width of the current picture and the width of the reference picture and sets a height scaling parameter HeightScale using the height of the current picture and the height of the reference picture (S1401).

For example, WidthScale can be set to the ratio of the width of the current picture to the width of the reference picture (WidthScale=CurPicWidth/RefPicWidth) and HeightScale can be set to the ratio of the height to the current picture to the height of the reference picture (Height=CurPicHeight/RefPicHeight).

The decoder determines whether WidthScale is less than 1 (S1402).

That is, the decoder determines whether the resolution of the reference picture is greater than the resolution of the current picture in the width direction (horizontal direction/axis).

When WidthScale is less than 1 as a determination result in step S1402, the decoder performs a downscaling process on the reference picture in the width direction (S1403) (i.e., RefPicWidth*WidthScale).

For example, when WidthScale=0.5, the decoder performs ½ scaling on the reference picture in the width axis (horizontal axis).

When WidthScale is not less (or is greater) than 1 as a determination result in step S1402, the decoder performs an upscaling process on the reference picture in the width direction (S1404).

If the resolution of the reference picture is identical to the resolution of the current picture on the width axis, the upscaling process may be bypassed.

The decoder determines whether HeightScale is less than 1 (S1405).

That is, the decoder determines whether the resolution of the reference picture is greater than the resolution of the current picture in the height direction (vertical direction/axis).

When HeightScale is less than 1 as a determination result in step S1405, the decoder performs a downscaling process on the reference picture in the height direction (S1406) (i.e., RefPicHeight*HeightScale).

When HeightScale is not less (or is greater) than 1 as a determination result in step S1405, the decoder performs an upscaling process on the reference picture in the height direction (S1407).

If the resolution of the reference picture is identical to the resolution of the current picture on the height axis, the upscaling process may be bypassed.

FIG. 15 is a schematic diagram of the reference picture management process of FIG. 14.

FIG. 15 illustrates a case in which the resolution of a reference picture 1501 is greater than the resolution of a current picture 1504 on both the width axis (horizontal axis/direction) and the height axis (vertical axis/direction).

The decoder determines whether the resolution of the reference picture 1501 is greater than the resolution of the current picture 1504 in the width direction (horizontal direction).

Since FIG. 15 illustrates a case in which the resolution of the reference picture 1501 is greater than the resolution of the current picture 1504 in the width direction, the decoder downscales the reference picture 1501 in the width direction (horizontal direction) to generate a reference picture 1502 downscaled in the width direction.

The decoder determines whether the resolution of the reference picture 1501 is greater than the resolution of the current picture 1504 in the height direction (vertical direction).

Since FIG. 15 illustrates a case in which the resolution of the reference picture 1501 is greater than the resolution of the current picture 1504 in the height direction, the decoder downscales the reference picture 1502, which has been downscaled in the width direction, in the height direction (vertical direction) to generate a reference picture 1503 downscaled in the width and height directions.

In addition, the decoder predicts a current picture on the basis of the reference picture to which the reference picture management process has been applied (i.e., the reference picture 1503 downscaled in both the width and height directions in FIG. 15).

Although FIGS. 14 and 15 illustrate a case in which the resolutions of the reference picture and the current picture are compared in the width direction and then compared in the height direction, the present invention is not limited thereto and the comparison order may be changed.

Furthermore, the RPMP may be designed to be adapted to the environment of a codec through various methods in addition to the methods illustrated in FIGS. 14 and 15.

FIG. 16 is a diagram illustrating a method of performing downsampling prediction according to an embodiment of the present invention.

It is assumed that the resolution of a reference picture 1601 is twice the resolution of a current picture 1602 on both the width and height axes (i.e., WidthScale=HeightScale=0.5) as shown in FIG. 16.

In this case, if the corresponding codec uses half-pel motion information, a downscaling process need not be performed on the reference picture as shown in FIGS. 14 and 15. That is, when a prediction sample is derived from the current reference picture (the picture having a width and a height twice those of the current picture) through 2:1 subsampling during prediction, downscaling effect can be obtained.

This is normalized as follows. When motion information in units of fractional-pel (1/n) (e.g., half-pel or quarter-pel) is used in the codec, if the resolution of a reference picture is m times the resolution of a current picture, a prediction sample can be derived from the current reference picture through n:1 subsampling during prediction without downscaling the reference picture.

Hereinafter, a method for efficiently performing temporal motion vector prediction when a current picture and a reference picture have different resolutions will be described as an embodiment of the reference picture management process.

In the aforementioned up/downscaling processes (i.e., S1403, S1404, S1406 and S1407) in the reference picture management process of FIG. 14, the decoder can also perform a scaling process on motion information by an up/downscaling rate (i.e., scaling factor) as well as a picture size. This will be described with reference to the following figure.

FIG. 17 illustrates a method of scaling motion information when a current picture and a reference picture have different resolutions according to an embodiment of the present invention.

For example, the decoder obtains a scaled reference picture and then scales all pieces of motion information in the reference picture by a scaling factor.

In addition, the decoder may newly obtain collocated motion in units of a 4×4 block. This is because the unit of the 4×4 block (block A or block B in FIG. 10) of the reference picture scaled according to the scaling factor may not be aligned with an original prediction unit, as shown in FIG. 17.

In other words, when motion information of a collocated block in the reference picture is used as a motion information predictor in order to derive motion information of a current block in a current picture, which motion information in the reference picture is used as the motion information predictor of the current block is ambiguous if the collocated block is block A or block B.

Accordingly, when the 4×4 block is not aligned with the original prediction unit, as described above, motion information of an original prediction unit of the scaled reference picture, which overlaps with the position of the top-left sample of the 4×4 block, can be used as motion information of the 4×4 block.

Referring to FIG. 17, since the position of the left-top sample of block A is included in prediction unit A, a scaled motion vector of prediction unit A is allocated as a new motion vector of block A. Since the position of the left-top sample of block B is included in prediction unit B, a scaled motion vector of prediction unit B is allocated as a new motion vector of block B.

Although the method of scaling motion vectors of all prediction blocks in a scaled reference picture and then allocating a motion vector of a prediction block including the left-top sample of each block as a motion vector of the corresponding block in units of a 4×4 block has been described, the present invention is not limited to the method of allocating a motion vector in units of a 4×4 block and a scaled motion vector can be allocated in units of a block having a minimum size which can have a motion vector.

Hereinafter, a method of efficiently decoding a current picture when the bit-depth or dynamic range of the current picture differs from that of a reference picture is proposed as an embodiment of the reference picture management process.

FIG. 18 illustrates a homography matrix for correcting a bit-depth or dynamic range difference between a current picture and a reference picture according to an embodiment of the present invention.

For example, when switching from a segment including an HDR (High Dynamic Range) picture or a picture encoded into 10 bits to a segment including an SDR (Standard Dynamic Range) picture or a picture encoded into 8 bits occurs, it is necessary to transform the HDR picture into the SDR picture or transform the 10-bit picture into the 8-bit picture and then to use the picture as a reference picture.

Accordingly, such a transformation process can be performed through the RPMP. For example, a decoder can transform an original reference picture (10-bit input in FIG. 18) into a new reference picture (8-bit output in FIG. 18) through various curves (i.e., various linear/nonlinear functions) as shown in FIG. 18.

Here, optimum transformation can be performed using tone mapping and dynamic range information transmitted through a tone mapping information SEI (Supplemental Enhancement Information) message, a knee function information SEI message, and a color remapping information SEI message. That is, an encoder can signal information on a transfer function to the decoder.

When there is no related SEI message, the encoder and the decoder may previously decide and use a technique of using curve B which is a linear transfer curve by default, a technique of transforming a reference picture into a different dynamic range using a transfer function of video usability information (VUI), a characteristic function or a default curve, or the like.

Hereinafter, a method of efficiently decoding a current picture when the color format or color gamut of the current picture differs from that of a reference picture is proposed as an embodiment of the reference picture management process.

For example, when the color format of the reference picture is 4:4:4 and the color format of the current picture is 4:2:0, a decoder may scale down chrominance components Cr and Cb of the reference picture by ½ in the horizontal direction (horizontal direction/axis) and the vertical direction (vertical direction/axis) through the RPMP to generate a new reference picture. That is, the chrominance components Cr and Cb of the reference picture are up/downscaled in the horizontal and vertical directions such that the color format of the reference picture becomes identical to the color format of the current picture.

Here, chroma resampling filter hint SEI may be used or the encoder and the decoder may decide and use a default sampling filter.

When there is no chrominance component to be referred to, such as a case in which the color format of the reference picture is 4:0:0 and the color format of the current picture is 4:2:0, or up/down scaling (or up/down sampling) is impossible, a default chrominance component value agreed between the encoder and the decoder may be used.

If the color gamut of the current picture differs from the color gamut of the reference picture (e.g., the color gamut of the reference picture is BT2020 and the color gamut of the current picture is BT209), the color gamut of the reference picture encoded in BT2020 can be transformed into the color gamut of the current picture using color_primaries, transfer_characteristics and color remapping info SEI transmitted through VUI.

FIG. 19 is a diagram illustrating a video decoding method according to an embodiment of the present invention.

Referring to FIG. 19, a decoder determines whether a current picture and a reference picture have different properties (S1901).

In this case, the method described with reference to FIG. 13 may be used in order to determine whether the current picture and the reference picture have different properties.

Here, properties may include at least one of a resolution, a bit-depth, a color format, a dynamic range and an aspect ratio.

The decoder transforms the reference picture such that the reference picture has the same properties as those of the current picture when the current picture and the reference picture have different properties (S1902).

That is, the decoder can perform the above-described reference picture management process (RPMP) and the methods according to the above-described various embodiments can be used.

For example, when the ratio (i.e., scaling factor) of the width and/or height of the current picture to the width and/or height of the reference picture is less than 1, the decoder can downscale the reference picture by the ratio in the width and/or height directions.

When the ratio of the width and/or height of the current picture to the width and/or height of the reference picture is greater than 1, the decoder can upscale the reference picture by the ratio in the width and/or height directions.

In addition, the decoder can scale the motion vector of the reference picture by the scaling factor of down/upscaling of the reference picture and allocate a motion vector of a prediction block which includes a left-top sample of the block and is included in the reference picture in units of a block having a minimum size that can have a motion vector.

When the dynamic range and/or the bit-depth of the reference picture differ from the dynamic range and/or the bit-depth of the current picture, the decoder may transform the dynamic range and/or the bit-depth of the reference picture using a predetermined linear or nonlinear function.

Furthermore, when the color format of the reference picture differs from that of the current picture, the decoder may up/downscale chrominance components of the reference picture in the horizontal and vertical directions.

The decoder performs inter-prediction on the current picture in units of a predetermined block using the transformed reference picture (S1903).

Here, when motion information in units of 1/n fractional-pel is used, the decoder can derive a prediction sample from the reference picture in units of a block through n:1 subsampling without downscaling the reference picture.

In addition, the methods described with reference to FIGS. 5 to 9 may be used in order to perform inter-prediction.

Meanwhile, the above-described steps S1901 and S1902 may be performed in units of a picture (or slice) in the decoder. Here, steps S1901 and S1902 may be performed prior to decoding of a coding unit. In addition, the steps may be performed before or after the reference picture is stored in DPB.

In addition, steps S1901 and S1902 may be performed before motion compensation is performed in a process of performing inter-prediction in units of a predetermined block (e.g., prediction block) in the current picture.

FIG. 20 is a diagram illustrating a decoding device according to an embodiment of the present invention.

Referring to FIG. 20, the decoding device according to the present invention implements the functions, processes and/or methods proposed in FIGS. 5 to 19.

The decoding device may include a property determination unit 2001, a transform unit 2002 and an inter-prediction unit 2003. The decoding device illustrated in FIG. 20 is merely an example and may further include components (e.g., components of the decoder illustrated in FIG. 2) which are not illustrated in FIG. 20.

The property determination unit 2001 determines whether a current picture and a reference picture have different properties.

In this case, the method described with reference to FIG. 13 may be used in order to determine whether the current picture and the reference picture have different properties.

Here, properties may include at least one of a resolution, a bit-depth, a color format, a dynamic range and an aspect ratio.

The transform unit 2002 transforms the reference picture such that the reference picture has the same properties as those of the current picture when the current picture and the reference picture have different properties.

That is, the transform unit 2002 can perform the above-described reference picture management process (RPMP) and the methods according to the above-described various embodiments can be used.

For example, when the ratio (i.e., scaling factor) of the width and/or height of the current picture to the width and/or height of the reference picture is less than 1, the transform unit 2002 can downscale the reference picture by the ratio in the width and/or height directions.

When the ratio of the width and/or height of the current picture to the width and/or height of the reference picture is greater than 1, the transform unit 2002 can upscale the reference picture by the ratio in the width and/or height directions.

In addition, the transform unit 2002 can scale the motion vector of the reference picture by the scaling factor of down/upscaling of the reference picture and allocate a motion vector of a prediction block in the reference picture including the left-top sample of a block in units of a block having a minimum size that can have a motion vector.

When the dynamic range and/or the bit-depth of the reference picture differ from the dynamic range and/or the bit-depth of the current picture, the transform unit 2002 may transform the dynamic range and/or the bit-depth of the reference picture using a predetermined linear or nonlinear function.

Furthermore, when the color format of the reference picture differs from that of the current picture, the transform unit 2002 may up/downscale chrominance components of the reference picture in the horizontal and vertical directions.

The inter-prediction unit 2003 performs inter-prediction on the current picture in units of a predetermined block using the transformed reference picture.

Here, when motion information in units of 1/n fractional-pel is used, the inter-prediction unit 2003 can derive a prediction sample from the reference picture in units of a block through n:1 subsampling without downscaling the reference picture.

In addition, the methods described with reference to FIGS. 5 to 9 may be used in order to perform inter-prediction.

Meanwhile, the property determination unit 2001 and the transform unit 2002 may perform operations in units of a picture (or slice) or may perform operations before motion compensation is performed in a process of performing inter-prediction in units of a predetermined block (e.g., prediction block) in the current picture.

Embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an exemplary embodiment of the present invention or included as a new claim by a subsequent amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described preferred embodiments of the present invention are illustrative only and are not intended to represent all aspects of the invention, and those skilled in the art should understood that the invention is to cover all modifications, equivalents, and alternatives falling within the spirit and scope of the invention.

The invention claimed is:

1. A video decoding method comprising:
   determining whether a current picture and a reference picture have different property;
   transforming the reference picture to have the same property as the current picture when the current picture and the reference picture have different property; and
   performing inter-prediction on the current picture in units of a predetermined block using the transformed reference picture,
   wherein the property includes at least one of a resolution, a bit-depth, a color format, a dynamic range, and an aspect ratio, and
   wherein the transforming of the reference picture comprises downscaling the reference picture by the aspect ratio in width and/or height directions when the aspect ratio of the width and/or height of the current picture to the width and/or height of the reference picture is less than 1.

2. The video decoding method according to claim 1, wherein the transforming of the reference picture comprises:
   upscaling the reference picture by the aspect ratio in the width and/or height directions when the aspect ratio of the width and/or height of the current picture to the width and/or height of the reference picture is greater than 1.

3. The video decoding method according to claim 2, wherein the performing of inter-prediction comprises:
   deriving a prediction sample of the predetermined block from the reference picture through n:1 subsampling without downscaling the reference picture when motion information in units of 1/n fractional-pel is used.

4. The video decoding method according to claim 3, wherein the transforming of the reference picture comprises:
   scaling a motion vector of the reference picture by a scaling factor of down/upscaling of the reference picture; and
   allocating a motion vector of a prediction block including a left-top sample of the block and included in the reference picture in units of a block having a minimum size that can have a motion vector.

5. The video decoding method according to claim 1, wherein the transforming of the reference picture comprises:
   transforming a dynamic range and/or a bit-depth of the reference picture using a predetermined linear or non-linear function when the dynamic range and/or the bit-depth of the reference picture differ from those of the current picture.

6. The video decoding method according to claim 1, wherein the transforming of the reference picture comprises:
   up/downscaling a chrominance component of the reference picture in horizontal and vertical directions when the reference picture and the current picture have different color formats.

7. The video decoding method according to claim 1, wherein the inter-prediction is divided into uni-direction prediction in which only one past picture or future picture is used as a reference picture on a time axis with respect to a single block and bi-directional prediction in which both the past and future pictures are referred at the same time.

8. The video decoding method according to claim 3, wherein a shadow block in which an upper-case letter is written indicates an integer sample location, and a block not having a shadow in which a lower-case letter is written indicates a fraction sample location.

9. The video decoding method according to claim 1, further comprising:
   a decoder configured to decode a motion parameter for a current block,
   wherein the decoder is configured to perform motion compensation on the current block using the decoded motion parameter.

10. A video decoding device comprising:
   a property determination unit for determining whether a current picture and a reference picture have different property;
   a transform unit for transforming the reference picture to have the same property as those of the current picture when the current picture and the reference picture have different property; and
   an inter-prediction unit for performing inter-prediction on the current picture in units of a predetermined block using the transformed reference picture, wherein the property includes at least one of a resolution, a bit-depth, a color format, a dynamic range, and an aspect ratio, and wherein the transform unit is further configured to downscale the reference picture by the aspect ratio in width and/or height directions when the aspect ratio of the width and/or height of the current picture to the width and/or height of the reference picture is less than 1.

\* \* \* \* \*